(12) United States Patent
Autin et al.

(10) Patent No.: US 7,445,757 B2  
(45) Date of Patent: Nov. 4, 2008

(54) DEVICE FOR CATALYTIC TREATMENT OF SMELLS AND FILTERING HOOD EQUIPPED THEREWITH

(75) Inventors: Francis Autin, Charron (FR); Joel Barrault, Liguge (FR); Jean-Paul Chevrier, Saint Cyr en Val (FR); Stephane Pasquiers, Velizy (FR); Antoine Rousseau, Paris (FR); Jean-Michel Tatibouet, Poitiers (FR)

(73) Assignee: Fagorbrandt SAS, Rueil Malmaison (FR)

( * ) Notice: Subject to any disclaimer, the term of this patent is extended or adjusted under 35 U.S.C. 154(b) by 771 days.

(21) Appl. No.: 10/451,185

(22) PCT Filed: Dec. 21, 2001

(86) PCT No.: PCT/FR01/04165

§ 371 (c)(1), (2), (4) Date: Jun. 20, 2003

(87) PCT Pub. No.: WO02/49743

PCT Pub. Date: Jun. 27, 2002

(65) Prior Publication Data

US 2004/0033178 A1   Feb. 19, 2004

(30) Foreign Application Priority Data

Dec. 21, 2000  (FR) .................................. 00 16772

(51) Int. Cl.  
*B01J 19/08* (2006.01)  
*H05F 3/00* (2006.01)

(52) U.S. Cl. ........................ 422/186.04; 60/273; 60/275

(58) Field of Classification Search ............ 422/186.04; 60/273, 275  
See application file for complete search history.

(56) References Cited

U.S. PATENT DOCUMENTS 5,609,736 A * 3/1997 Yamamoto ................... 204/164  
5,756,053 A * 5/1998 Hoke et al. .................. 422/174  
2002/0014071 A1* 2/2002 Balmer et al. .................. 60/273

FOREIGN PATENT DOCUMENTS

| EP | 0 585 047 A | 3/1994 |
|----|----|----|
| EP | 1 086 740 | 3/2001 |
| FR | 2 739 791 | 4/1997 |
| WO | WO 96/01969 | 1/1996 |
| WO | WO 99/43419 | 9/1999 |
| WO | WO 00/18494 | 4/2000 |

* cited by examiner

*Primary Examiner*—Arun S Phasge  
(74) *Attorney, Agent, or Firm*—Young & Thompson

(57) ABSTRACT

A device for catalytic treatment of cooking smells includes a monolithic support (10), including passage channels (11) for cooking fumes and active treating particles deposited on the monolithic support (10), an apparatus for generating a discharge plasma (12,13) arranged on either side of the monolithic support.

13 Claims, 1 Drawing Sheet

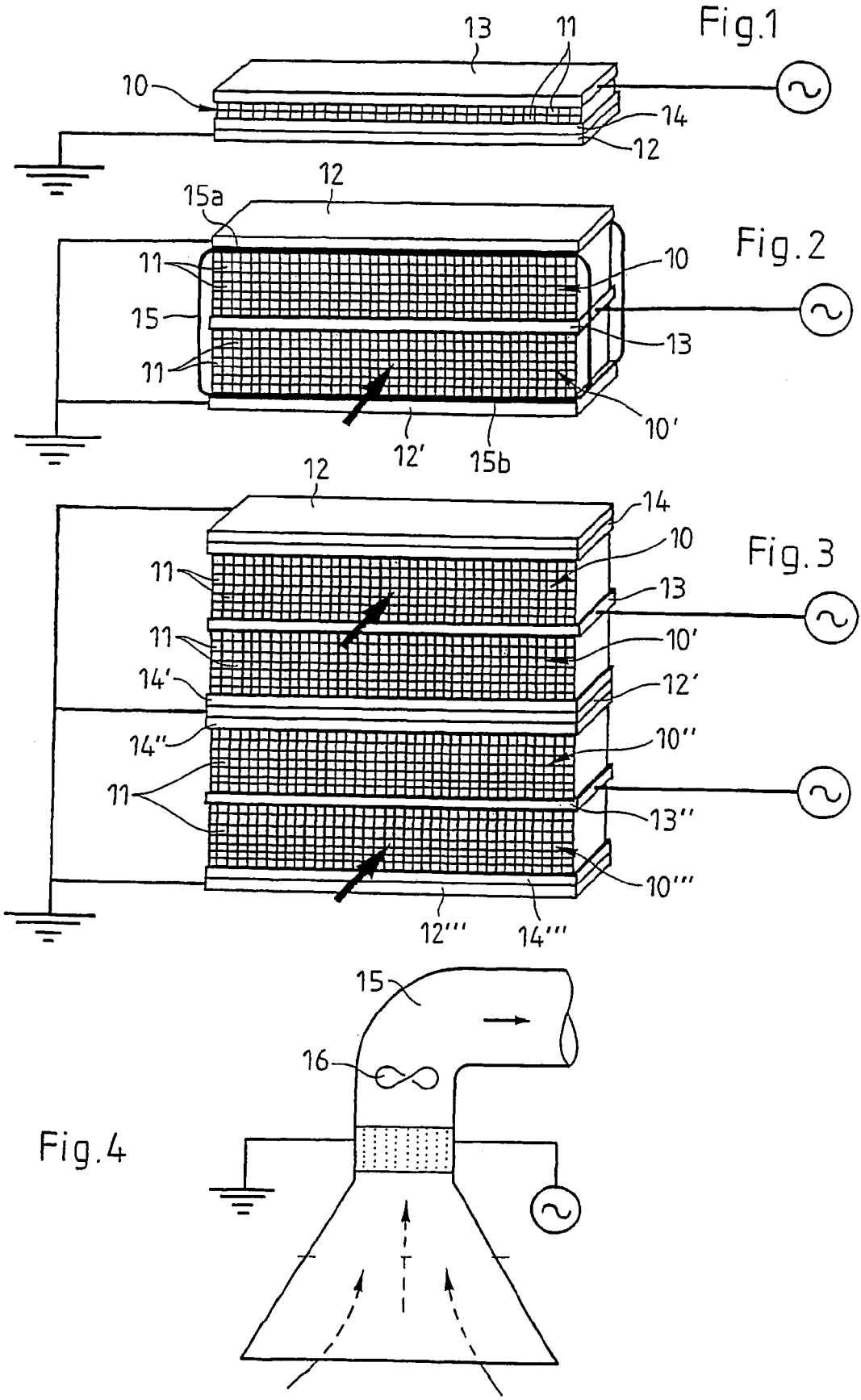

DEVICE FOR CATALYTIC TREATMENT OF SMELLS AND FILTERING HOOD EQUIPPED THEREWITH

The present invention relates to a device for catalytic treatment of cooking smells.

It also relates to a system for catalytic treatment of smells and a hood for filtering cooking fumes using a treatment device according to the invention.

More generally, the field of the invention is that of domestic filtering hoods.

When cooking food, the cooking fumes and gases contain many greasy and/or malodorous particles in suspension.

There exist a multitude of malodorous molecules each present in small quantities in cooking fumes and generally consisting of volatile organic compounds (VOC).

It is important to be able to treat these malodorous molecules effectively, in particular if the filtering hood is of the recycling type in which the cooking gases and fumes are returned to the ambient air after treatment.

Devices for treating smells by catalytic reaction to degrade volatile organic compounds are known in the art.

One such treatment device is described in U.S. Pat. No. 5,904,750, for example.

The catalytic treatment device includes a support formed by a honeycomb structure defining passages for cooking fumes.

This support comprises a washcoat containing zirconium and at least one oxide of manganese, cerium or cobalt.

At least one precious metal is deposited onto the washcoat for the purposes of the catalytic reaction.

Volatile organic compounds can be treated relatively effectively in this way provided that a temperature of 250° C. is maintained around the catalyst.

However, in a domestic filtering hood the operating temperature cannot exceed 80° C. without additional heating.

Under the resulting relatively low temperature conditions a catalytic treatment device as previously described proves ineffective for treating cooking fumes.

An object of the present invention is to propose a device for catalytic treatment of cooking smells that degrades malodorous molecules effectively under the usual temperature conditions prevailing in a filtering hood.

To this end, a device for catalytic treatment of cooking smells includes a monolithic support comprising passages through which cooking fumes pass and active treatment particles deposited on the monolithic support.

According to the invention, the catalytic treatment device includes means disposed on either side of the monolithic support for generating a discharge plasma.

Thus a plasma is created inside the passages in the support coated with active treatment particles through which the cooking fumes pass.

The volatile organic compounds are then activated by the plasma, encouraging the catalytic transformation of the malodorous molecules in contact with the active treatment particles.

This activation is achieved directly at the catalysis sites formed inside the passages through which the cooking fumes pass.

The catalytic treatment device according to the invention therefore forms a one-piece structure that is readily adaptable to a domestic filtering hood duct.

Around 30% of the volatile organic compounds can be destroyed with a treatment device according to the invention heated to a temperature substantially equal to 80° C.

By way of comparison, in the absence of a plasma, the same treatment device would have to be heated to a temperature of 180° C. to achieve the same rate of destruction of volatile organic compounds.

According to a preferred feature of the invention, the means for generating a discharge plasma comprise two electrodes disposed on respective opposite faces of the monolithic support.

Thus a discharge plasma can be produced between two electrodes within the thickness of the monolithic support.

This embodiment is particularly practical when the electrodes are stuck directly to a face of the monolithic support.

According to another preferred feature of the invention, the monolithic support comprises at least two series of parallel passages in respective parallel planes and the electrodes of the discharge plasma generating means are plates disposed parallel to said planes of the passages.

Thus the discharge plasma is generated between the electrodes, transversely to the direction in which the cooking fumes circulate in the parallel passages.

The cooking fumes therefore circulate in the discharge plasma generated in the passages in the monolithic support.

In another aspect, the invention provides a system for catalytically treating smells in cooking fumes, characterized in that it comprises at least two treatment devices according to the invention, the discharge plasma generation means of two juxtaposed treatment devices having a common electrode.

In this way a plurality of treatment devices can be associated without demultiplying the electrodes necessary for generating a discharge plasma in each of the catalysis supports.

According to a preferred feature of the invention, the treatment system is disposed in a duct in which the cooking fumes circulate, an insulative material duct portion extending between an electrode and the monolithic support of at least one treatment device.

The duct in which the fumes circulate then forms a dielectric barrier between the electrode and the monolithic support, necessary for forming a dielectric barrier discharge (DBD) plasma.

Finally, the present invention provides a hood for filtering cooking fumes comprising a catalytic treatment device or system according to the invention.

The resulting filtering hood can effectively treat cooking gases and fumes, in particular before they are recycled into the ambient air, without exceeding an operating temperature limit of the order of 80° C.

Other features and advantages of the invention will become more apparent in the course of the following description.

In the appended drawings, which are provided by way of non limiting example:

FIG. 1 is a diagrammatic perspective view showing the principle of a treatment device according to the invention;

FIG. 2 is a perspective view showing one embodiment of a treatment system according to the invention in a duct in which fumes circulate;

FIG. 3 is a perspective view of a second embodiment of a treatment system according to the invention; and FIG. 4 is a diagram showing a hood according to the invention for filtering fumes.

A combined plasma-catalysis treatment device is described first with reference to FIG. 1 to illustrate the principle of the invention.

The treatment device 10 includes a catalyzer associated with means disposed on either side of the catalyzer for generating a discharge plasma.

To be more precise, the catalyzer takes the form of a one-piece block 10 in which are formed passages 11 through which cooking fumes pass.

The monolithic block, or support, 10 is made of a ceramic such as cordierite $Mg_2Al_4Si_5O_{18}$, for example.

In this example, the monolithic support 10 comprises two series of parallel passages in respective parallel planes.

Active treatment particles are deposited on the support 10 to form different catalysis sites.

The active treatment particles can take the form of a noble metal such as platinum (Pt), palladium (Pd), rhodium (Rh), gold (Au), silver (Ag) or ruthenium (Pu).

The active particles can equal take the form of a non-noble metal such as iron (Fe), copper (Cu), cobalt (Co), nickel (Ni), manganese (Mn), or chromium (Cr).

The active particles chosen can of course consist of one of the above metals or a combination of two or more of them.

The metals are deposited on the support 10 in the form of small particles widely dispersed over the surface of the support 10.

To increase the surface area of exchange for the catalytic reactions and to encourage the dispersion of the active particles, the support 10 is preferably coated with mineral oxides forming a washcoat.

The washcoat can be formed of mineral oxides based on aluminum (Al), cerium (Ce), lanthanum (La), zirconium (Zr), manganese (Mn), or titanium (Ti).

The washcoat can be formed of one of the above oxides or a combination of two or more of them.

For example, the washcoat can be formed of a layer of alumina and the active treatment particles of platinum.

To generate a dielectric barrier discharge (DBD) plasma, the plasma generating means comprise two electrodes 12, 13 disposed on respective opposite faces of the support 10 and an auxiliary device for applying a voltage pulse to the electrodes.

The discharge is therefore produced between a ground electrode 12, for example of duralumin, and an electrode 13, for example of copper (Cu), referred to as the "hot" electrode.

The second electrode 13 is thin, with a maximum thickness of a few millimeters. For example, it can be formed by a metal adhesive tape with conductive adhesive adhering directly to a face of the one-piece support 10.

The electrode 13 is called the "hot" electrode because it receives a voltage pulse generated by an auxiliary device, also a source of electrical current. It is the application of this voltage pulse that generates the plasma. There is no minimum or maximum value for the time for which the voltage pulse remains at its peak value.

An insulative material plate 14 is disposed between the ground electrode 12 and the support 10 to form a dielectric barrier.

The insulative material of this plate is a dielectric material with a suitable relative permittivity, typically from 3.5 (quartz) to 4 000 ($BaTiO_3$).

The electrodes 12, 13 are therefore parallel to the planes of the passages 11, with the result that the DBD plasma is generated inside the passages 11, within the thickness of the support 10.

The peak value of the voltage pulse that must be applied to the hot electrode 13 is determined essentially by the chosen thickness of the support 10. The voltage is directly proportional to this thickness.

For example, for dry air, it is necessary to apply a voltage of 22 kV in the case of a support 10 that is 2.5 mm thick and includes two planes of parallel passages between the electrode 13 and the ground electrode 12, while it is necessary to apply a voltage of 38 kV in the case of a support 10 that is 5.5 mm thick and includes four planes of parallel passages.

The operation of the device is not limited by the chosen thickness of the support 10 provided that the applied voltage is sufficiently high for that thickness.

There is no maximum limit value for this voltage.

The number of series of parallel passages 11 and the thickness of the monolithic support 10 are therefore a function of the electrical voltage applied to the terminals of the electrodes 12, 13.

The specific energy of the DBD plasma depends on the voltage applied and the surface area of the hot electrode 13.

It has been found that the specific energy is directly proportional to the distance between the electrodes and the surface area of the hot electrode 13.

For example, for dry air and a hot electrode surface area of the order of 15 $cm^2$, a specific energy of the order of 4 $mJ/cm^3$ is obtained with a thickness of 2.5 mm and two planes of parallel passages and a specific energy of the order of 8.3 $mJ/cm^3$ is obtained with a thickness of 5.5 mm and four planes of parallel passages.

The operation of the device is not limited by the surface area of the hot electrode 13, provided that the auxiliary device generating the voltage pulse can supply an electrical current sufficient for the chosen thickness and surface area.

In operation, the electrodes 12, 13 and the auxiliary device for applying the voltage pulse are adapted to generate a discharge at a frequency from 1 to 10 kHz. The duration of the current pulse corresponding to the discharge is a physical characteristic of the system. The plasma generating means are therefore adapted to generate a voltage pulse of at least 20 kV and a current pulse with a typical duration of 100 ns.

Around 30% of the malodorous molecules are destroyed with an ambient temperature of 80° C. around the treatment device.

This kind of combined plasma-catalysis treatment device is therefore particularly suitable for treating cooking smells and fumes and for incorporation into a domestic filtering hood.

To improve the effectiveness of the treatment device previously described, two of the devices can be juxtaposed, as shown in FIG. 2.

In this embodiment, the two juxtaposed treatment devices have a common electrode, corresponding to the hot electrode 13 connected to the electrical current source.

The supports 10, 10' of the respective treatment devices are therefore disposed on either side of the common electrode 13.

The system as a whole is disposed in a duct 15 in which cooking fumes circulate.

The treatment system is disposed in the circulation duct 15 so that the passages 11 in the supports 10, 10' are disposed in the direction in which the cooking fumes or gases circulate in the duct 15.

An insulative material portion 15a of the duct 15 extends between an electrode 12, which is a ground electrode in this example, and the support 10 of a treatment device.

Symmetrically, another insulative material portion 15b of the duct 15 extends between the electrode 12', which is a ground electrode in this example, and the monolithic support 10' of the other treatment device.

The insulative material of the duct in which the gases circulate 15 is a dielectric material with a suitable relative permittivity, typically from 3.5 (quartz) to 4 000 ($BaTiO_3$).

FIG. 3 shows a second embodiment of a system for catalytic treatment of smells.

In this embodiment, four treatment devices as described previously with reference to FIG. 1 are juxtaposed, a common electrode generating a plasma between two adjacent treatment devices.

Thus FIG. 3 shows, successively, from top to bottom, a ground electrode 12 separated from a support 10 by a dielectric plate 14 and an electrode 13 disposed between two adjacent supports 10, 10' of two respective treatment devices.

A ground electrode 12' is also disposed between two supports 10', 10" of two other adjacent treatment devices.

Dielectric plates 14', 14" are disposed on opposite sides of the ground electrode 12'.

Finally, a common electrode 13" is disposed between the respective supports 10", 10''' of the last two juxtaposed treatment devices.

A dielectric plate 14''' and a ground electrode 12''' are disposed at the bottom of the stack of treatment devices.

The juxtaposed treatment devices can be multiplied in this way to improve the effectiveness of the treatment of cooking fumes.

The treatment systems previously described are particularly suitable for equipping a hood for filtering cooking fumes such as a domestic filtering hood as shown in FIG. 4.

The general principle of the filtering hood is to evacuate fumes recovered from above a hob and drawn into the evacuation duct 15 by an extractor fan 16.

The treatment device according to the invention can be disposed in the duct 15 so that the fumes pass through the treatment device via the passages 11.

This kind of filtering hood generally has a throughput of the order of 500 m$^3$/h, the cooking gases or fumes passing through the treatment device at a relatively low temperature of the order of 70 to 80° C.

The plasma generated in this way in the catalyzer and on the path of the cooking gases effectively degrades the malodorous molecules responsible for bad cooking smells.

Of course, many modifications could be made to the embodiments described above without departing from the scope of the invention.

The invention claimed is:

1. A device for catalytic treatment of cooking smells, the device including a monolithic support (10) comprising passages (11) through which cooking fumes pass and electrodes (12, 13) disposed on either side of the monolithic support (10) for generating a discharge plasma, wherein,
    the monolithic support (10) is coated with mineral oxides on top of which active treatment particles formed of one or more metals are deposited, and
    an insulative material plate (14) disposed between one electrode (12) and a monolithic support (10).

2. A treatment device according to claim 1, characterized in that the means for generating a discharge plasma comprise two electrodes (12, 13) disposed on respective opposite faces of the monolithic support (10).

3. A treatment device according to claim 1, characterized in that the monolithic support (10) comprises at least two series of parallel passages (11) in respective parallel planes and the electrodes (12, 13) of the discharge plasma generating means are plates disposed parallel to said planes of the passages.

4. A treatment device according to claim 3, characterized in that the number of series of parallel passages (11) in the monolithic support (10) is a function of the electrical voltage applied to the terminals of the electrodes.

5. A treatment device according to claim 1, characterized in that the monolithic support (10) has a thickness between the electrodes (12, 13) of the discharge plasma generating means that is a function of the electrical voltage applied to the terminals of the electrodes.

6. A treatment device according to claim 1, characterized in that the active treatment particles are formed of one or more metals chosen from platinum, palladium, rhodium, gold, silver, ruthenium, iron, copper, cobalt, nickel, manganese and chromium.

7. A treatment device according to claim 1, characterized in that the discharge plasma generation means are adapted to generate a voltage pulse of at least 20 kV and a current pulse with a typical duration of 100 ns at a frequency from 1 Hz to 10 kHz.

8. A system for catalytically treating smells in cooking fumes, characterized in that it comprises at least two treatment devices according to claim 1, the discharge plasma generation means of two juxtaposed treatment devices having a common electrode (13, 12', 13").

9. A treatment system according to claim 8, characterized in that it is disposed in a duct (15) in which the cooking fumes circulate, an insulative material duct portion (15a, 15b) extending between an electrode (12, 12') and the monolithic support (10, 10') of at least one treatment device.

10. A hood for filtering cooking fumes, characterized in that it comprises a treatment device according to claim 1.

11. A hood for filtering cooking fumes, characterized in that it comprises a treatment system according to claim 8.

12. A device for catalytic treatment of cooking smells, comprising:
    a monolithic support (10) comprising passages (11) through which cooking fumes pass;
    active treatment particles deposited on the monolithic support (10); and
    a means (12, 13) for generating a discharge plasma, wherein,
    the means for generating a discharge plasma comprise two electrode plates (12,13) disposed on respective opposite faces of the monolithic support (10), and
    an insulative material plate (14) is disposed between one electrode plate (12) and the monolithic support (10).

13. The treatment device according to claim 12, wherein the monolithic support (10) is coated with oxides on top of which the active treatment particles are deposited.

* * * * *